(12) United States Patent
Quinn et al.

(10) Patent No.: US 7,582,682 B2
(45) Date of Patent: Sep. 1, 2009

(54) REMOVAL OF PCB AND OTHER HALOGENATED ORGANIC CONTAMINANTS FOUND IN EX SITU STRUCTURES

(75) Inventors: Jacqueline W. Quinn, Titusville, FL (US); Christian A. Clausen, Chuluota, FL (US); Cherie L. Geiger, Geneva, FL (US); Christina Coon, Marietta, GA (US); Laura B. Filipek, Deltona, FL (US); Cristina M. Berger, Cape Canaveral, FL (US); Kristen M. Milum, Austin, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 44 days.

(21) Appl. No.: 11/838,916

(22) Filed: Aug. 15, 2007

(65) Prior Publication Data

US 2008/0177125 A1  Jul. 24, 2008

Related U.S. Application Data

(62) Division of application No. 10/977,622, filed on Oct. 27, 2004, now Pat. No. 7,271,199.

(60) Provisional application No. 60/523,656, filed on Nov. 17, 2003.

(51) Int. Cl.
*B01F 3/08* (2006.01)
*A61L 9/14* (2006.01)
*A62D 3/34* (2007.01)

(52) U.S. Cl. ............... 516/22; 422/28; 422/30; 422/31; 588/313; 588/315; 588/319; 588/406

(58) Field of Classification Search ............ 516/22; 422/28, 30, 31; 588/313, 315, 319
See application file for complete search history.

(56) References Cited

U.S. PATENT DOCUMENTS

| 4,002,435 | A |  | 1/1977 | Wenzel et al. |
| 5,399,350 | A | * | 3/1995 | Potter .................... 424/418 |
| 5,824,322 | A | * | 10/1998 | Balasubramanian ...... 424/280.1 |
| 6,664,298 | B1 |  | 12/2003 | Reinhart et al. |
| 7,008,964 | B2 |  | 3/2006 | Clausen et al. |
| 2004/0069720 | A1 | * | 4/2004 | Clausen et al. ............. 210/749 |

OTHER PUBLICATIONS

K. Peter C. Vollhardt, 12-2 The Catalytic Hydrogenation of Alkenes, Organic Chemistry, W.H. Freeman, 1987, 460-462.

* cited by examiner

*Primary Examiner*—Timothy J. Kugel
(74) *Attorney, Agent, or Firm*—Randall M. Heald; Thomas W. Leffert

(57) ABSTRACT

Emulsified systems of a surfactant-stabilized, biodegradable water-in-solvent emulsion with bimetallic particles contained with the emulsion droplets are useful at removing PCBs from ex situ structures. The hydrophobic emulsion system draws PCBs through the solvent/surfactant membrane. Once inside the membrane, the PCBs diffuse into the bimetallic particles and undergo degradation. The PCBs continue to enter, diffuse, degrade, and biphenyl will exit the particle maintaining a concentration gradient across the membrane and maintaining a driving force of the reaction.

14 Claims, 1 Drawing Sheet

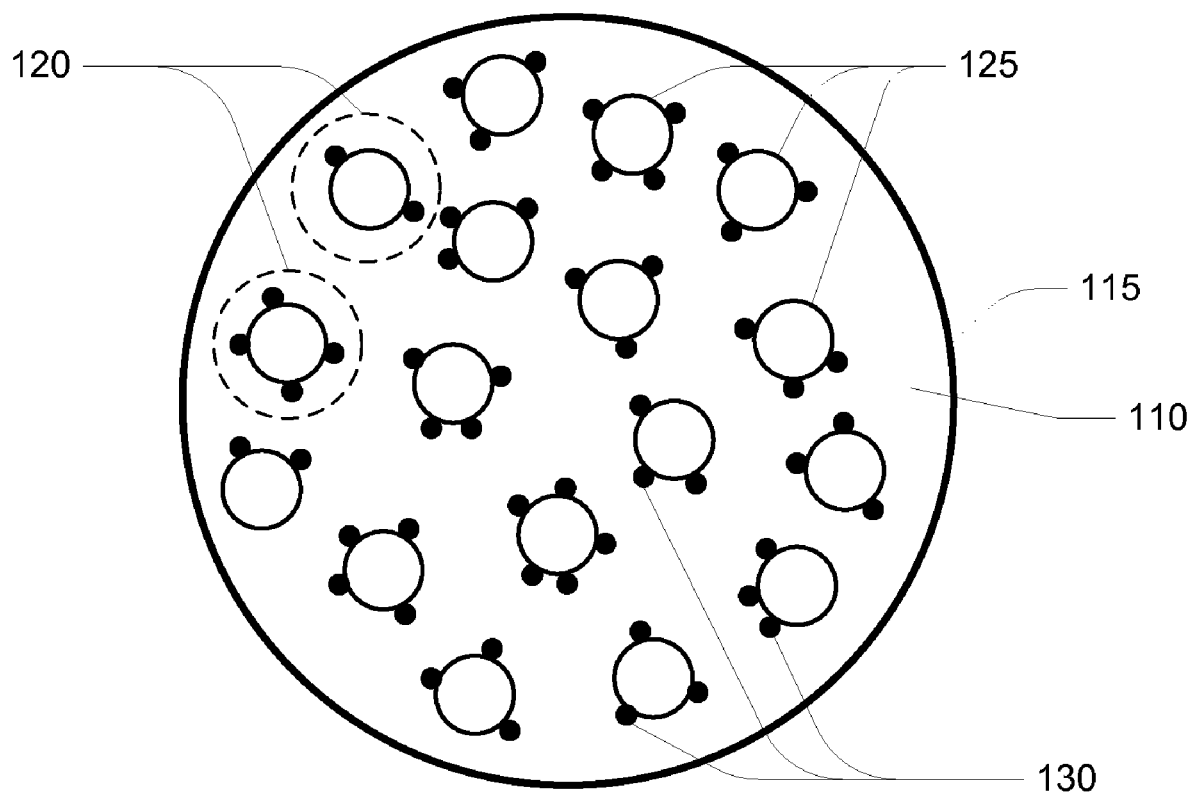

REMOVAL OF PCB AND OTHER HALOGENATED ORGANIC CONTAMINANTS FOUND IN EX SITU STRUCTURES

STATEMENT OF RELATED APPLICATIONS

This application is a divisional of U.S. application Ser. No. 10/977,622, filed Oct. 27, 2004, issued Sep. 18, 2007 as U.S. Pat. No. 7,271,199, which is commonly assigned and incorporated by reference herein, and claims priority to U.S. Provisional Patent Application Ser. No. 60/523,656 filed Nov. 17, 2003, which is commonly assigned.

STATEMENT OF GOVERNMENT INTEREST

The invention described herein was made in the performance of work under a NASA contract and by an employee of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

TECHNICAL FIELD OF THE INVENTION

The present invention relates generally to the removal of contaminants and in particular to the removal of polychlorinated biphenyls (PCBs) or other halogenated contaminants from ex situ structures.

BACKGROUND OF THE INVENTION

The removal of contaminants from natural resources is an ongoing, significant problem. Numerous tactics have been considered with various degrees of success. In U.S. patent application Ser. No. 09/972,296 filed on Oct. 2, 2001 and issued Dec. 16, 2003 as U.S. Pat. No. 6,664,298, which is owned by the Assignee of the present invention and incorporated in the present application by express reference thereto, a method was disclosed for delivering the reactant material to the contaminant in situ. A method incorporated the concept of either emulsification of the reactant or encapsulation of the reactant prior to its delivery to the contaminant in situ. The Method disclosed and claimed in patent application Ser. No. 09/972,296 has particular success in using a zero-valent metal emulsion containing metal particles, surfactant, oil and water in a method of enhancing dehalogenation of dense non-aqueous phase liquid (DNAPL) sources.

A second patent application, PCT/US 03/16610, was filed May 28, 2003, corresponding to U.S. patent application Ser. No. 10/449,907, also filed on May 28, 2003 and issued Mar. 7, 2006 as U.S. Pat. No. 7,008,964, which patent also is owned by the Assignee of the present invention and is incorporated into the present application by reference thereto. This second patent application is directed, among other features, to a zero-valent metal emulsion containing zero-valent metal particles doped with a catalytic metal to remediate halogenated aromatic compounds, such as polychlorinated biphenyls (PCBs), from natural resources, i.e., in the ground.

PCBs have been used in many industrial applications because of their robust physical and chemical properties such as their resistance to acids, bases and oxidation, their excellent dielectric characteristics and their thermal stability at high temperatures (up to 350° C.). PCBs were abundantly used as a stabilizer in paints in the late 1960s. When PCBs were released into the environment, they were sorbed to particulate matter that was then dispersed over large areas. PCBs can be introduced into the food chain by the uptake of contaminated soils by biota and humans can directly inhale or absorb PCBs by dermal contact. Although the United States Environmental Protection Agency (EPA) has banned the manufacture of PCBs since 1979, PCBs are still present in the environment posing possible adverse health affects to both humans and animals. In fact, PCBs can still be found in the paints located on NASA property at a number of the Centers. The PCB levels in painted structures on the Kennedy Space Center (KSC) have been documented to be as high as 31,000 ppm.

Currently, only land filling or smelting operations are available for complete treatment of ex situ structures containing PCBs. Sandblasting or water blasting operations can be utilized to remove contaminated coatings from structures; however, this material must also be thermally treated or land-filled in a Toxic Substances Control Act (TSCA) regulated landfill.

As will become clear here below, the present invention expands on the concept described in the previously cited applications to effectively treat PCBs found in painted structures or other ex situ facilities. For the reasons stated above, and for other reasons stated below that will become apparent to those skilled in the art upon reading and understanding the present specification, there is a need in the art for alternative methods and compositions for the removal of PCBs from ex situ structures.

SUMMARY

The various embodiments of the invention provide an emulsified system of a surfactant-stabilized, biodegradable water-in-solvent emulsion with nano or microscale bimetallic particles contained with the emulsion droplets. The hydrophobic emulsion system draws PCBs through the solvent/surfactant membrane. Once inside the membrane, PCBs diffuse to the bimetallic particles and undergo degradation. The PCBs continue to enter, diffuse, degrade, and biphenyl or other benign byproduct will exit the particle maintaining a concentration gradient across the membrane and maintaining a driving force of the reaction.

For one embodiment, the invention provides a water-in-solvent emulsion. The emulsion includes a solvent phase having a solvent and a surfactant and a water phase having water and nano or microscale bimetallic particles. The bimetallic particles include a zero-valent metal component and a catalytic component that are milled together prior to forming the emulsion. The solvent can be toluene, d-limonene, hexanes or the like. The water phase may further include a surfactant and/or a hydrophilic solvent, such as methanol.

For another embodiment, the invention provides a water-in-solvent emulsion. The emulsion includes a solvent phase having a solvent and a surfactant and a water phase having water and nano or microscale bimetallic particles. The solvent is toluene, d-limonene, hexanes or the like. The water phase may further include a surfactant and/or a hydrophilic solvent, such as methanol. The bimetallic particles include a zero-valent metal component and a catalytic component.

For a further embodiment, the invention provides a method of removing contaminants from an ex situ structure. The method includes applying a water-in-solvent emulsion to the structure, where the emulsion includes a solvent phase having a solvent and a surfactant and a water phase having water and nano or microscale bimetallic particles. The bimetallic particles include a zero-valent metal component and a catalytic component. The water phase may further include a surfactant and/or a hydrophilic solvent.

The invention further includes methods of varying scope.

BRIEF DESCRIPTION OF THE DRAWING

The FIGURE is a conceptual depiction of an emulsified system in accordance with the invention.

DETAILED DESCRIPTION OF THE INVENTION

In the following detailed description of the preferred embodiments, the embodiments are described in sufficient detail to enable those skilled in the art to practice the invention, and it is to be understood that other embodiments may be utilized and that logical, mechanical and chemical changes may be made without departing from the spirit and scope of the present invention. The following detailed description is, therefore, not to be taken in a limiting sense, and the scope of the present invention is defined only by the appended claims and equivalents thereof.

The present invention provides an in-situ PCB remediation process that is applicable for the treatment of ex situ structures containing metal and PCB compounds within externally applied coatings such as paint, caulking material, elastomeric coating, etc. While it is known that zero-valent iron (Fe) is very effective in the treatment of chlorinated hydrocarbons, such as dissolved trichloroethylene (TCE), zero-valent iron, by itself, is unable to completely dechlorinate PCBs dissolved in aqueous solutions. As described herein, a catalyst, such as palladium (Pd) is added to the zero-valent iron or other zero-valent metal particle, such as zero-valent magnesium (Mg). While the Pd/Fe bimetallic particles have been shown to effectively remove dissolved phase PCBs, the use of Pd/Fe and/or Pd/Mg particles to treat impregnated PCBs would be minimized by the coating material itself. As will be explained below, the emulsion technology of the present invention can be used to remediate PCB-containing coatings that have historically been applied to ex situ support structures. As will be explained, a dense, reactive emulsion applied to ex situ structures functions to disassociate the PCBs from the coating, i.e., paint, and degrades the chlorinated aromatics into biphenyl, or other benign by-product. In addition, the invention describes a method for ball milling carbon-supported noble metals and transition metals together to form a very effective and economical catalytic system.

The present invention is directed to an emulsified system consisting of a surfactant-stabilized, biodegradable water-in-toluene or water-in-d-limonene emulsion with nano or microscale bimetallic particles contained with the emulsion droplets. The hydrophobic emulsion system draws PCBs through the solvent/surfactant membrane (solvents may include but are not limited to d-limonene and toluene and a food-grade surfactant may be chosen). Once inside the membrane, the metals and PCBs diffuse to the bimetallic particles and undergo degradation in the case of chlorinated compounds. The PCBs continue to enter, diffuse, degrade, and biphenyl or other benign byproduct will exit the particle maintaining a concentration gradient across the membrane and maintaining a driving force of the reaction. Microscale magnesium (Mg) coated with a very small amount of palladium (Pd) was chosen as the media for the PCB degradation. Other catalysts may be used instead of Pd. These active catalysts include zinc (Zn), nickel (Ni), copper (Cu) and others.

The present invention uses an emulsion system to degrade PCBs into benign end products. The unique emulsion may be formulated as follows: 40 ml toluene, 80 ml water, 20 g bimetallic metal, 12 g surfactant. The bimetallic metal may comprise either microscale magnesium or iron, e.g., approximately 0.1-10 microns or smaller, ball milled with 1-10% palladium supported on carbon. The mass percent palladium by weight ranges from approximately 0.01-15%, and more preferably 0.08-8%. While toluene is utilized as the solvent, the present invention may use d-limonene, hexanes or other similar solvents.

As an alternative to ball milling, the metal particles, e.g., Fe or Mg, may be coated with a catalytic metal, e.g., Pd, via solution. For one example, approximately 100 g of microscale zero-valent iron particles, such as those available through Alfa Aesar, Inc. or BASF, Inc., are weighed and placed in a Buchner Funnel. The microscale zero-valent iron particles are then washed with 100 ml of a 5% hydrochloric (HCl) or sulfuric ($H_2SO_4$) solution (5 mL HCL or $H_2SO_4$ and 95 mL of deoxygenated de-ionized water). The microscale zero-valent iron particles are then filtered. Then, 0.19 g of $K_2PdCl_6$ is dissolved in 100 mL of deoxygenated de-ionized water. The filtered microscale zero-valent iron particles are then placed in an Erlenmeyer flask and the $K_2PdCl_6$ solution added. The resulting mixture is stirred in the flask using a magnetic stirrer for 5 minutes. The solution is then allowed to settle and filtered until dry. Using a procedure as described, the resulting bimetallic microscale particles had a palladium coating of approximately 0.06% Pd/Fe. For another example, microscale zero-valent iron may be coated with palladium (Pd) using a 40 g/L Pallamerse solution. The Pallamerse solution is made up of 10.0% potassium dinitrosulfate palladate (II), $K_2(Pd(NO_2)_2-SO_4)$. The following procedure indicates one such method for coating 2.5 g of microscale zero-valent iron particles. The microscale zero-valent iron particles are washed in a Buchner Funnel with 10 mL of 10% $H_2SO_4$ solution. The microscale zero-valent iron particles are then rinsed with 10 mL of deoxygenated de-ionized water. Then, 5 mL of the Pallamerse solution is added and the mixture is allowed to sit for 2 minutes before filtering. After the mixture is filtered, the microscale zero-valent iron particles are washed with 10 mL of deoxygenated de-ionized water. The material is then filtered until dry. The resulting bimetallic microscale particles had a palladium coating of approximately 7% Pd/Fe.

The Figure is a conceptual depiction of an emulsified system in accordance with the invention. The emulsified system has a solvent phase 105 and a water phase 110 contained in the solvent phase and separated by an interface 115. Droplets of the water phase 110 contain bimetallic particles 120. Bimetallic particles 120 contain a zero-valent metal component 125 and a catalytic component 130.

The solvent phase 105 contains a hydrophobic solvent, such as toluene, d-limonene, hexanes and the like, suitable for transport of the PCBs or other halogenated organic contaminants to droplets of the water phase 110. The solvent phase 105 further includes a surfactant chosen to promote a water-in-solvent emulsion. The water phase 110 may also include a surfactant or a hydrophilic solvent, such as methanol, to reduce surface tension of the droplet and to promote transport of the PCBs or other halogenated organic contaminants to the bimetallic particles 120 contained within the water phase 110.

Choice of surfactants for the solvent phase 105 and water phase 110 is generally well understood in the art. To produce a water-in-solvent emulsion, the surfactant system must generally be more hydrophobic than hydrophilic. The surfactant system can include more than one surfactant.

For one embodiment, the zero-valent metal component 125 contains iron or magnesium. For a further embodiment, the catalytic component 130 contains a noble or transition metal catalyst. Some example catalysts include Pd, Zn, Ni or Cu.

EXPERIMENTAL RESULTS

The reaction rates are divided into two independent categories: the rate at which the emulsion can extract the PCBs from the paint and the rate at which the PCBs can be degraded by the bimetal and water reactants.

It is noted that a GC/MS (gas chromatograph/mass spectrometer) was utilized for evaluation of the results presented herein. However, an ECD (electron capture detector) tracking a specific congener simplifies the analysis. Data values presented are area counts except for retention time, which is expressed in minutes.

From Emulsion Extracts

TABLE 1

(An evaluation of how much PCB can be extracted into an emulsion - not a measurement of PCB degradation)

| Retention Time (minutes) | Paint Chip Initial Area Counts | Emulsion After Exposure to Paint Chip (Area Counts) | | 60 ppm Aroclor (Area Counts) (1254 Standard) |
|---|---|---|---|---|
| | | (2 hr) | (4 hr) | |
| 15.554 | 45947 | 28377 | 39920 | 2718 |
| 16.905 | 86164 | 51833 | 57038 | 3740 |
| 17.944 | 83396 | 45846 | 47023 | 3047 |
| 18.335 | 35695 | 21800 | 20459 | 1014 |

A Measurement of the Amount of Removal of PCB from Paint Chip after Exposure to Emulsion

TABLE 2

(PCB content in paint chip after exposure to emulsion)

| Retention Time | Paint Chip Initial Area Counts | PCB Area Count in the Paint Chip after 4 hr Exposure to Emulsion |
|---|---|---|
| 15.542 | 45947 | 5162 |
| 16.893 | 86164 | 8003 |
| 17.93 | 83396 | 7705 |
| 18.323 | 35695 | 3499 |

Evaluating the Activity of Neat Bimetal Treatment Systems in an Aqueous Solution of PCB

TABLE 3

40 ppm PCB 1260 Control - 0.8% Pd/FE

| | Area Counts | | | |
|---|---|---|---|---|
| Retention Time | Control 1 | Day 4 | Day 5 | Day 6 |
| 17.923 | 1586 | 781 | 0 | 0 |

TABLE 4

40 ppm PCB Control - 0.8% Pd/Mg

| | Area Counts | | |
|---|---|---|---|
| Retention Time | Control 1 | Day 4 | Day 6 |
| 15.389 | 1060 | 382 | 0 |

TABLE 5

40 ppm PCB Control - 0.4% Pd/Mg

| | Area Counts | | |
|---|---|---|---|
| Retention Time | Control 1 | Day 4 | Day 5 |
| 17.711 | 967 | 0 | 0 |

The present invention has significant commercial application to government and industry in removing PCBs from paint and similar materials covering ex situ structures. Numerous NASA Centers have older metal structures upon which paints containing polychlorinated biphenyls (PCB) were applied. These painted structures are posing worker and ecological health hazards and, in several instances, are now considered a TSCA-level (Toxic Substance Control Act) waste. Some of the impacted structures could be refurbished and utilized for new Programs, but because the paint currently on the structures is heavily laden with PCBs, the Programs are unable to reuse or even discard these structures without significant cost. The embodiments of the invention detail a new and innovative solution to the removal of PCBs from painted structures using a "paint on and wipe off" bimetallic emulsion that extracts only the PCBs from the paint, and leaves the structure virtually unaltered.

Polychlorinated biphenyls (PCBs) are a group of synthetic aromatic compounds with the general formula $C_{12}H_{10-x}Cl_x$ that were historically used by industry because of their excellent dielectric properties and their resistance to heat and chemical degradation. Although the US Environmental Protection Agency (EPA) has banned the manufacture of PCBs since 1979, they currently can be detected at every NASA Center. PCBs have been introduced into the NASA work environment via improper disposal and accidental leaks from transformers, heat exchangers, and hydraulic systems. Formerly, PCBs were also extensively used in paints, as their properties enhanced structural integrity, reduced flammability and boosted antifungal properties. Because of the serious health problems associated with the bioaccumulation of PCBs in animals, including humans, and the desire for NASA Programs to have a quick and nondestructive means of removing PCBs from existing structures, the development of a "paint-on/wipe-off" emulsion for the removal of PCBs found in older painted structures is considered highly desirable.

In 2003, KSC initiated the development of a water-in-toluene emulsion containing a bimetallic reactant for the treatment of PCBs found in painted structures. The emulsion droplet has two functions. First and foremost, the exterior membrane of the emulsion, which consists of a mixture of surfactant and solvent, seeks to extract the PCBs that are contained within the 40-year old paint. Once these two chemicals have pulled the PCBs into the outer emulsion membrane, a concentration gradient forces them into contact with the water/bimetallic reactants that are located interior to the emulsion droplet. The water and bimetal initiate an abiotic, reductive dehalogenation reaction that completely degrades the PCBs to benign end-products that diffuse out of the emulsion membrane.

The emulsion developed in 2003 was applied to pieces of paint obtained from the abandoned Apollo Program's Launch Umbilical Tower (LUT). LUT paint chips were immersed in the PCB-removal emulsion for various periods of time extending from two hours to four days. Emulsion kinetics were evaluated from two perspectives; effective rate of PCB removal from the paint, and the kinetic degradation of the PCBs once interior to the emulsion droplet and in contact with the bimetallic reactant. Initial data indicates that complete PCB extraction and degradation from paint chips containing as high as 700 ppm total PCBs could be achieved in as little as 48 hours of exposure.

CONCLUSION

An emulsified system of a surfactant-stabilized, biodegradable water-in-solvent emulsion with bimetallic particles contained with the emulsion droplets have been described for the removal of PCBs from coated surfaces. The hydrophobic emulsion system draws PCBs through the solvent/surfactant membrane. Once inside the membrane, the PCBs diffuse to the bimetallic particles and undergo degradation. The PCBs continue to enter, diffuse and degrade to nonchlorinated products such as biphenyl, which then exits the emulsion droplet, maintaining a concentration gradient across the membrane and maintaining a driving force of the reaction.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A method of removing contaminants from an ex situ structure, comprising:
    applying a water-in-solvent emulsion to the structure, the emulsion comprising:
        a solvent phase comprising a solvent and a surfactant; and
        a water phase comprising water and microscale bimetallic particles;
        wherein the bimetallic particles comprise a zero-valent metal component and a catalytic component.

2. The method of claim 1, further comprising:
    exposing the structure to the emulsion for a period of time; and
    removing the emulsion from the structure.

3. The method of claim 2, wherein the period of time is approximately 48 to 240 hours.

4. The method of claim 2, wherein removing the emulsion from the structure further comprises wiping the emulsion off the structure.

5. The method of claim 1, further comprising:
    milling the zero-valent metal component with the catalytic component to form the bimetallic particles.

6. The method of claim 5, wherein the zero-valent metal component has a particle size of less than about 10 microns prior to milling.

7. The method of claim 5, wherein the catalytic component is supported on a carbon support structure prior to milling.

8. The method of claim 1, wherein the catalytic component is selected from the group consisting of noble metals and transition metals.

9. The method of claim 8, wherein the catalytic component is palladium.

10. The method of claim 1, wherein the water phase further comprises a surfactant and/or a hydrophilic solvent.

11. The method of claim 1, wherein the zero-valent metal component is selected from the group consisting of iron and magnesium.

12. The method of claim 1, wherein the catalytic component comprises approximately 0.01-15% by mass of the bimetallic particles.

13. The method of claim 1, wherein the solvent is selected from the group consisting of toluene, d-limonene and hexanes.

14. The method of claim 1, wherein the surfactant is a food-grade surfactant.

* * * * *